United States Patent
Smith et al.

(10) Patent No.: US 8,862,722 B2
(45) Date of Patent: Oct. 14, 2014

(54) METHOD AND SYSTEM FOR PROVIDING MONITORING OF NETWORK ENVIRONMENT CHANGES

(75) Inventors: Brian Smith, Littleton, CO (US); Bobby J. Peel, Lutz, FL (US); Jesse E. Perkins, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 130 days.

(21) Appl. No.: 12/751,637

(22) Filed: Mar. 31, 2010

(65) Prior Publication Data

US 2011/0246638 A1  Oct. 6, 2011

(51) Int. Cl.
| | | |
|---|---|---|
| G06F 15/16 | (2006.01) | |
| G06F 15/173 | (2006.01) | |
| H04L 12/26 | (2006.01) | |
| H04L 12/24 | (2006.01) | |

(52) U.S. Cl.
CPC .......... *H04L 41/069* (2013.01); *H04L 43/0817* (2013.01); *H04L 43/0811* (2013.01)
USPC ........... 709/224; 709/204; 709/205; 709/206; 709/207; 709/223; 709/225; 709/227; 709/228; 709/229; 709/200

(58) Field of Classification Search
USPC ................... 709/223–225, 227–229, 249, 20, 709/204–207, 200
See application file for complete search history.

(56) References Cited

U.S. PATENT DOCUMENTS

| | | | | |
|---|---|---|---|---|
| 6,694,203 | B2 * | 2/2004 | Wada et al. ..................... 700/97 |
| 6,809,505 | B2 * | 10/2004 | Peeke et al. ..................... 324/66 |
| 7,039,870 | B2 * | 5/2006 | Takaoka et al. ............... 715/736 |
| 2002/0019948 | A1 * | 2/2002 | Katou et al. .................. 713/202 |
| 2002/0156883 | A1 * | 10/2002 | Natarajan et al. ............. 709/224 |
| 2002/0165632 | A1 * | 11/2002 | Wada et al. ..................... 700/97 |
| 2003/0005095 | A1 * | 1/2003 | Fee ............................... 709/221 |
| 2003/0026524 | A1 * | 2/2003 | Kakizaki et al. ................ 385/16 |
| 2003/0085914 | A1 * | 5/2003 | Takaoka et al. ............... 345/734 |
| 2003/0212785 | A1 * | 11/2003 | Jibbe ............................. 709/224 |
| 2003/0233450 | A1 * | 12/2003 | Carley .......................... 709/224 |
| 2007/0078975 | A1 * | 4/2007 | LeMay et al. ................. 709/224 |
| 2007/0130334 | A1 * | 6/2007 | Carley .......................... 709/224 |
| 2007/0223918 | A1 * | 9/2007 | Kakizaki et al. ................ 398/12 |
| 2008/0049979 | A1 * | 2/2008 | Schindler et al. ............. 382/113 |
| 2010/0176962 | A1 * | 7/2010 | Yossef ..................... 340/815.45 |
| 2011/0173315 | A1 * | 7/2011 | Aguren ......................... 709/224 |

* cited by examiner

Primary Examiner — Edward Kim

(57) ABSTRACT

An approach is provided for monitoring network environment changes. A plurality of events relating to activation of one or more network elements are tracked, wherein the events include movement of cables for the network element and activities corresponding to verification of connections over the cables. Event information relating to the events are stored. The event information includes status information of the verification of the connections. Access is provided to the stored event information for presentation via a portal.

18 Claims, 17 Drawing Sheets

METHOD AND SYSTEM FOR PROVIDING MONITORING OF NETWORK ENVIRONMENT CHANGES

BACKGROUND INFORMATION

Undoubtedly communication networks are integral to the storage and distribution of information and media. Such networks can support a variety of applications and services, from entertainment to financial services as well as health care services. Not surprisingly, voluminous data, stemming from these applications, have to be managed in a manner that avoid disruptions with respect to access to stored data. Depending on the particular service (e.g., supporting financial transactions), even a minor interruption of data access can involve incurring significant losses to the user or organization. One typical source of disruption is the replacement/upgrade of the network equipment, or movement of equipment. For example, the network equipment to be replaced is traditionally put off-line or otherwise deactivated, and a new network equipment is installed and tested. The interval between the deactivation of the predecessor network equipment and the successful installation of the new network equipment can substantial, especially in the case of physical movement of cables are involved. Namely, the cables need to be moved from the old equipment and reconnected to the new one. Conventionally, the delay associated with deinstallation and installation (which also involves testing the new network equipment and associated connections) is exacerbated by the fact that logistical coordination and communication among different users (e.g., field engineers, test engineers, managers, etc.) have been lacking. The inability to effectively communicate during such cutovers can greatly increase the downtime.

Therefore, there is a need for an approach that can provide effective monitoring and reporting of changes within the network environment.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for monitoring of network environment changes are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a cutover process involving a storage area network (SAN), it is contemplated that these embodiments have applicability to any activation of network elements in any type of network environment.

Figure 1:
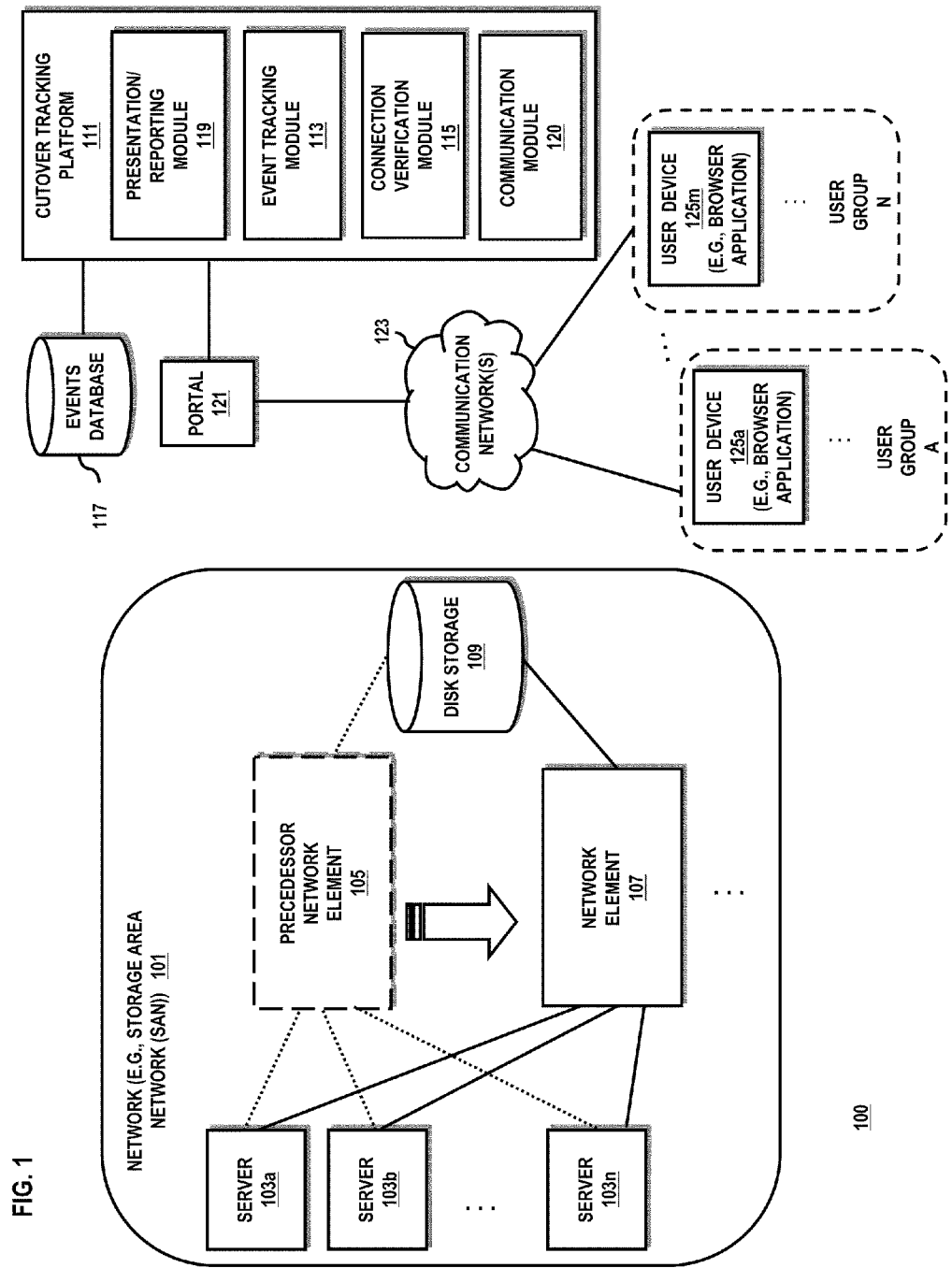
FIG. 1 is a diagram of a cutover tracking system configured to provide effective monitoring and reporting of cutover activities, according to an exemplary embodiment.

FIG. 1 is a diagram of a cutover tracking system configured to provide effective monitoring and reporting of cutover activities, according to an exemplary embodiment. For illustrative purposes, system 100 is described with respect to events pertaining to a cutover (or migration) of network elements or equipment within a network environment, such as a storage area network (SAN) 101. As shown, network 101 includes servers 103a-103n with connectivity to a network element 105a, which can include a switch, e.g., a Fibre Channel switch, that is to be replaced by another network element 107. As part of the SAN architecture, the switch 105 has a connection to a storage medium (e.g., disk storage) 109 and is a part of one or more switching fabrics for storage and retrieval among servers 103. Disk storage 109 can house various content, including digital media, e.g., textual data, audio data, video data, or a combination thereof. Under this cutover scenario, the servers 103 and the disk storage 109 require disconnection from switch 105 (denoted as a "predecessor" network element) and subsequent connection to a different switch 107. In practical SAN deployment, multiple switches can form each of the switching fabrics; this concept of a switching fabric is akin to segments of a local area network (LAN). Also, the SAN 101 can employ the small computer system interface (SCSI) protocol to transfer data from the servers 103 to the disk storage 109. By way of example, SAN 101 can support data center applications, wherein the number of servers 103 and associated cables for connection to the switch 105 can be extremely large. Furthermore, although servers 103 can be connected to the disk storage 109 with just one path, typically, a minimum of two paths are used to prevent a single switch failure from bringing down the server's connection to the SAN storage. In other words, storage is normally provisioned in a dual redundant fashion in order to guarantee that at least one path from the server to the disk storage 109 is maintained at all times. Hence, the complexity, in terms of management and logistical issues, increases dramatically under such an environment, thereby introducing greater delay with respect to the availability of the SAN 101.

The approach of system 100, according to certain embodiments, relate to the coordination of the replacement of one or more network elements (e.g., Vendor X's switches) with one or more different network elements (e.g., Vendor Y's switches) in a densely populated SAN environment with multiple user (or support) groups. This approach, as implemented via cutover tracking platform 111, facilitates communication between user groups, e.g., storage engineering support team (responsible for monitoring the physical activities of the SAN Fibre cables being moved in a facility) and server engineering support team (responsible for performing the dual path validation of the servers 103). Other user groups may be defined according the particular environment and service provider. The communication can be performed via real-time web interfaces; e.g., GUIs can created with Microsoft® SharePoint DataViews using filtering to group the servers under their appropriate support groups. As the migration proceeds, a high level view (e.g., the Executive View) can be created to provide a real-time web interface with instant status of the progress of the migration to all interested users (parties) including upper level (or executive) management, for example. Under this arrangement, other communication methods can be supplanted; that is, these web interfaces can used in place of any combination of multiple bridges, email, and/or group instant messaging (IM) chats.

Figure 2A:
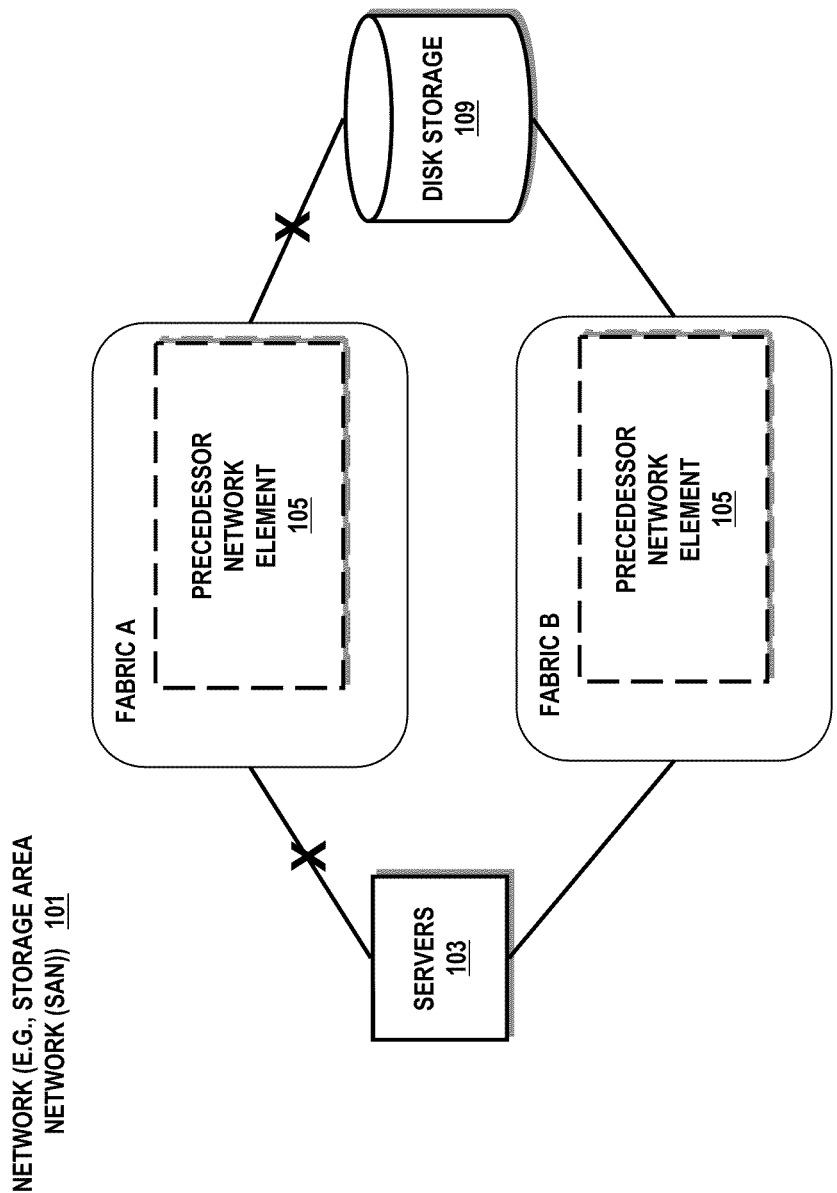
FIGS. 2A-2C are diagrams depicting activation of a network element involve multiple switching fabrics in the system of FIG. 1, according to an exemplary embodiment.
Figure 2B:
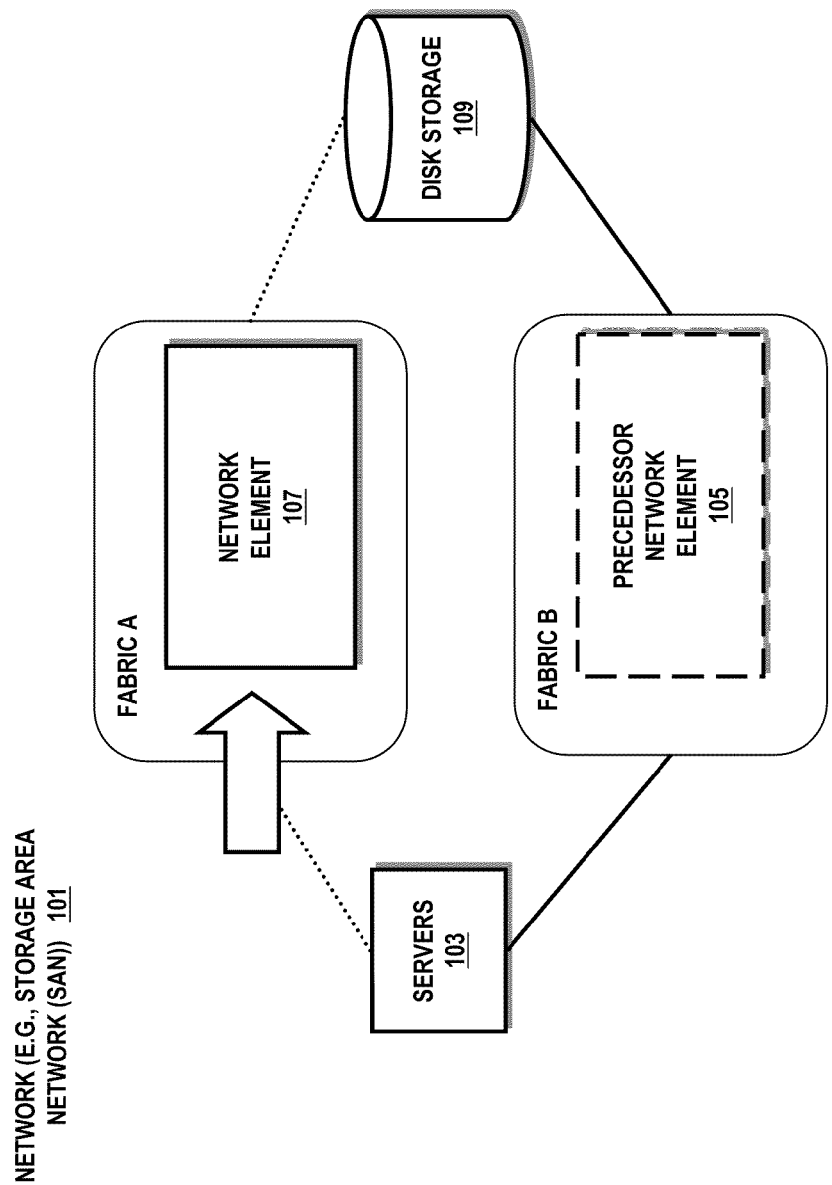
Figure 2C:
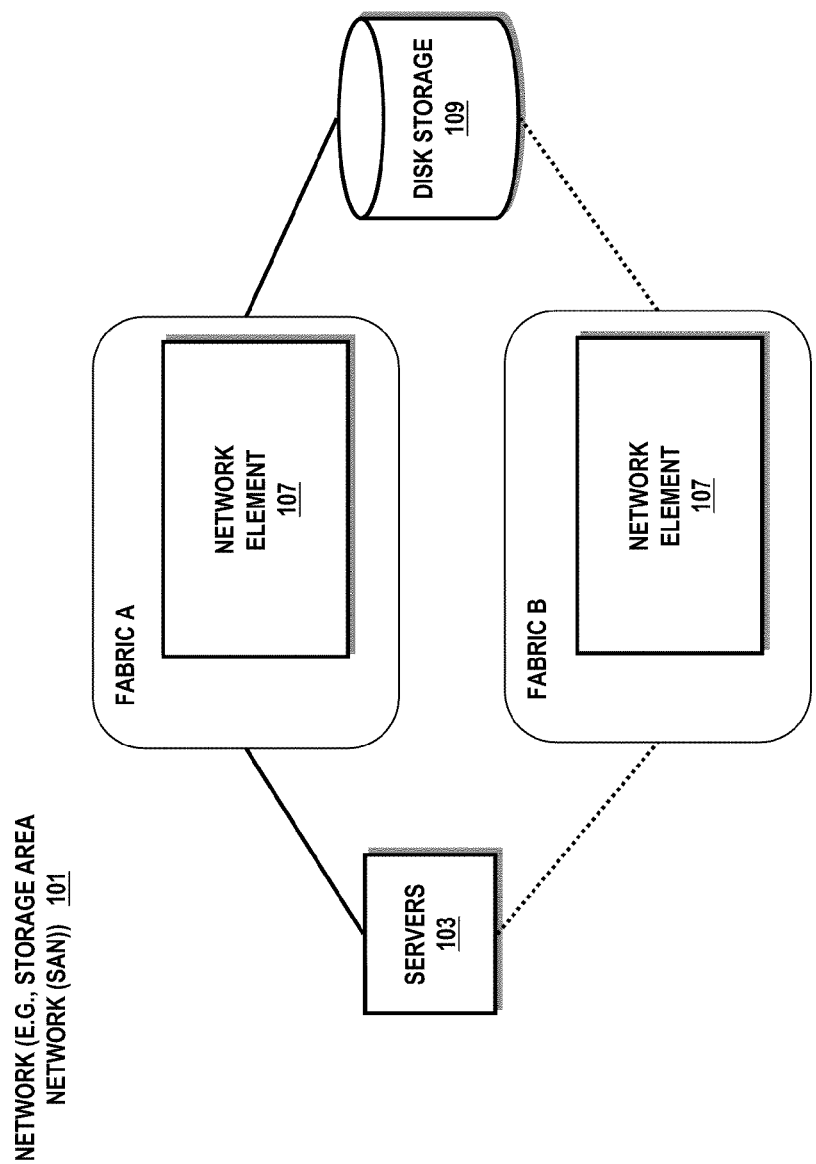

FIGS. 2A-2C are diagrams depicting activation of a network element involve multiple switching fabrics in the system of FIG. 1, according to an exemplary embodiment. In this example, removal of switch 105 (predecessor switch) in Fabric A is required, while maintaining connectivity to the disk storage 109 via Fabric B. A typical scenario would be the replacement of network elements associated with different manufacturers (or vendors). In this manner, a new network element (of another vendor), e.g., switch 107, can be activated in Fabric A, as depicted in FIG. 2B. Subsequently, after dual connectivity, for example, is validated for both switches 105 and 107 by a server engineer, replacement of the predecessor switch 105 can occur, as shown in FIG. 2C. That is, new switch 107 can be activated within Fabric B, and the predecessor switch 105 is removed. According one embodiment, the cutover process is performed, while the servers 103 are fully operational. In practical systems, the number of servers 103 can be in the thousands, and with numerous switches in a single fabric.

To minimize the disruption from cutover activities, a cutover tracking platform 111 (FIG. 1) monitors network environment changes within network 101. In one embodiment, platform 111 includes an event tracking module 113 configured to track (or monitor), in real-time or near real-time, events relating to activation of one or more network elements (of which one switch 107 is shown) are tracked, wherein the events include movement of cables for the network element 107 as well as activities corresponding to verification of connections over the cables. The verification can be performed by a connection verification module 115. Event information relating to the events are stored in database 117. The event information includes status information of the verification of the connections.

Cutover tracking platform 111 can alternatively facilitate ease of communication among the many user groups through communication module 120, which can be configured to provide web interfaces in real-time. In conjunction with the portal 121, the communication module 120 can reduce the communication "chatter" significantly that would otherwise be generated by the user groups—e.g., storage engineering team notifying the server engineering team that the cable had been moved and subsequently the server engineering team notifying the storage engineering team that the server's SAN storage paths had been verified. This reduction in chatter, for instance, allows the storage engineering team to focus on troubleshooting the expected problems that may occur, rather than tending to the sometimes onerous activity of communicating with others—particularly when users' schedules are at odds (e.g., test engineers, production engineers, and managers can possess very different business schedules).

However, it is contemplated that communication module 120 can also be used to initiate communication sessions among the users using other technologies to supplement the web interface views. The communication sessions, according to certain embodiments, can also include e-mail, instant communications (e.g., instant messaging, and short messaging service (SMS)), telephone calls, file transfer, etc.

Although the modules 113, 115, 119, and 120 are separately, it is contemplated that they may be combined in various combinations, depending on the particular application; moreover, the modules 113, 115, 119, and 120 may implemented as software, firmware, hardware (e.g., chipset, processor, etc.), or a combination thereof.

Cutover tracking platform 111 also provides a presentation/reporting module 119 to retrieve the event information and message such data for the purposes of presentation and reports. As will be more fully described FIGS. 5B, 6B, and 8B-8D, this module 119 can generate various graphical user interface (GUI) views. Access is provided to the stored event information within events database 117 for presentation via a portal 121; the portal 121 can be provided as website (web server) that is accessible via browser applications.

As depicted, portal 121 can be accessed, via one or more communication networks 123, by user devices 125a-125m using, for example, browser (or web-based) applications. User devices 125a-125m can employ various communication technologies to communicate with network 123. By way of example, user devices 125a-125m may include desktop computers, notebook computers, servers, terminal workstations, customized hardware, or other equivalent apparatus. Also, user devices 125a-125m can encompass mobile devices, such as personal digital assistants (PDA), pocket personal computers, smart phones, tablets, handsets, and web appliances, as well as other mobile technologies capable transmitting and receiving data for presentation via a graphical user interface (GUI). The user devices 125a-125m, in one embodiment, are associated with users who may be defined according to user groups; within a business (such as a service provider), one user group may include field engineers; another user group may be test engineers. Furthermore, yet another set of users may involve upper level managers. In this manner, different users with varying roles can orchestra the cutover process cohesively and efficiently.

According to certain embodiments, the communication network 123 may include one or more networks such as a data network and/or a telephony network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network can be provided via a combination of circuit-switched technologies or a packetized voice infrastructure.

For the purpose of illustration, the communication network 123 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth, ultra-wideband (UWB), the IEEE 802.22 standard, etc.

According to certain embodiments, the platform 101 can further be configured to receive inputs regarding the progress of the cutover, with respect to movement of cables, successful testing and installation of the new network element, e.g., switch 107.

Figure 3:
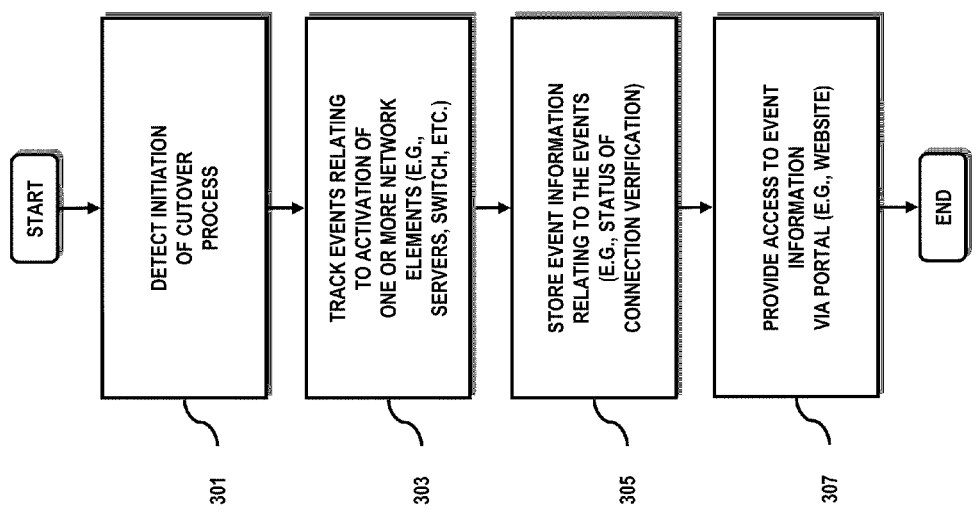
FIG. 3 is a flowchart of a process for tracking events associated with a cutover, according to an exemplary embodiment.

FIG. 3 is a flowchart of a process for tracking events associated with a cutover, according to an exemplary embodiment. In this process, cutover tracking platform 111 first detects, as in step 301, initiation of the cutover process for the network 101. Such information can be input by an appropriate user via the portal 121 or specified by the event tracking module 113. Next, events relating to activation of a network element 107 or one or more of the servers 103 are tracked, as in step 303. In step 305, information about the events are then stored; in one embodiment, the event information includes status information of the verification of the connections with the servers 103 and/or with the disk storage 109. Upon storing the event information, platform 111 can then permit access, per step 307, to the information either directly through the presentation/reporting module 119 or through portal 121.

Figure 4B:
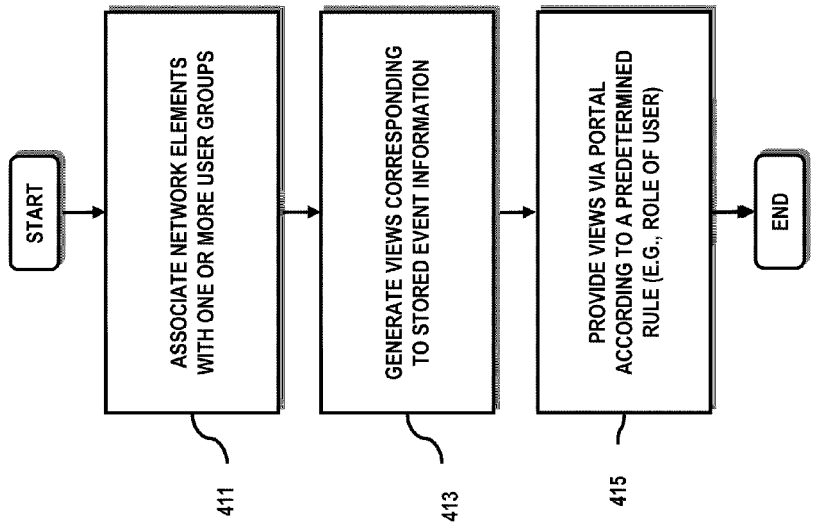
FIGS. 4A and 4B are flowcharts, respectively, of a process for updating status information related to cutover events, and a process for generating graphical user interface (GUI) views for presenting event information, according to various embodiments.
Figure 4A:
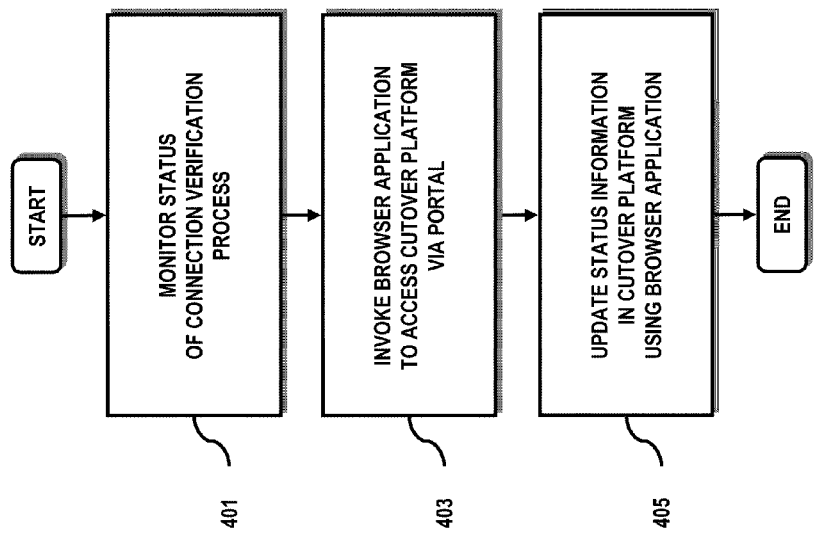

FIGS. 4A and 4B are flowcharts, respectively, of a process for updating status information related to cutover events, and a process for generating graphical user interface (GUI) views for presenting event information, according to various embodiments. As seen in FIG. 4A, in step 401, status of the connection verification process is monitored by a user. Such monitoring can be performed with the assistance of the connection verification module 115 of platform 111, according to one embodiment. Under this scenario, a user (e.g., test engineer) may invoke a browser application, as in step 403, on user device 125a, for example, then communicate with platform 111 using portal 121. According to one embodiment, conventional authentication procedures (e.g., user identifier and password) may be employed to login using portal 121. Next, in step 405, the user can then update the status information based on the user's personal knowledge of the cutover process—i.e., the user has responsibility for moving a cable or testing a connection, etc. This input can be performed in real-time, so that the latest information on the cutover is available to users with the appropriate authority (e.g., role).

As part of its function, platform 111 provides presentation of the event information graphically in form of GUI views. As mentioned, access to certain information can be regulated based on rules, such as the roles of the users. Also, platform 111 has the capability to provide access based on the association of the network elements with a user group; for example, the responsibility for testing of the particular network element 107 can rests with user group A, while the cable moves are monitored by user group N. Accordingly, per FIG. 4B, in step 411, platform 111 performs the association between network elements and one or more user groups. Thereafter, in step 413, views conveying various event information are generated. In one embodiment, these views can be provided, as in step 415, via portal 121 according to corresponding to a predetermined rule—e.g., the user's role and/or user groups' roles.

For the purposes of illustration, the GUI views are explained in the context of a SAN environment, as shown in FIGS. 5-8.

Figure 5A:
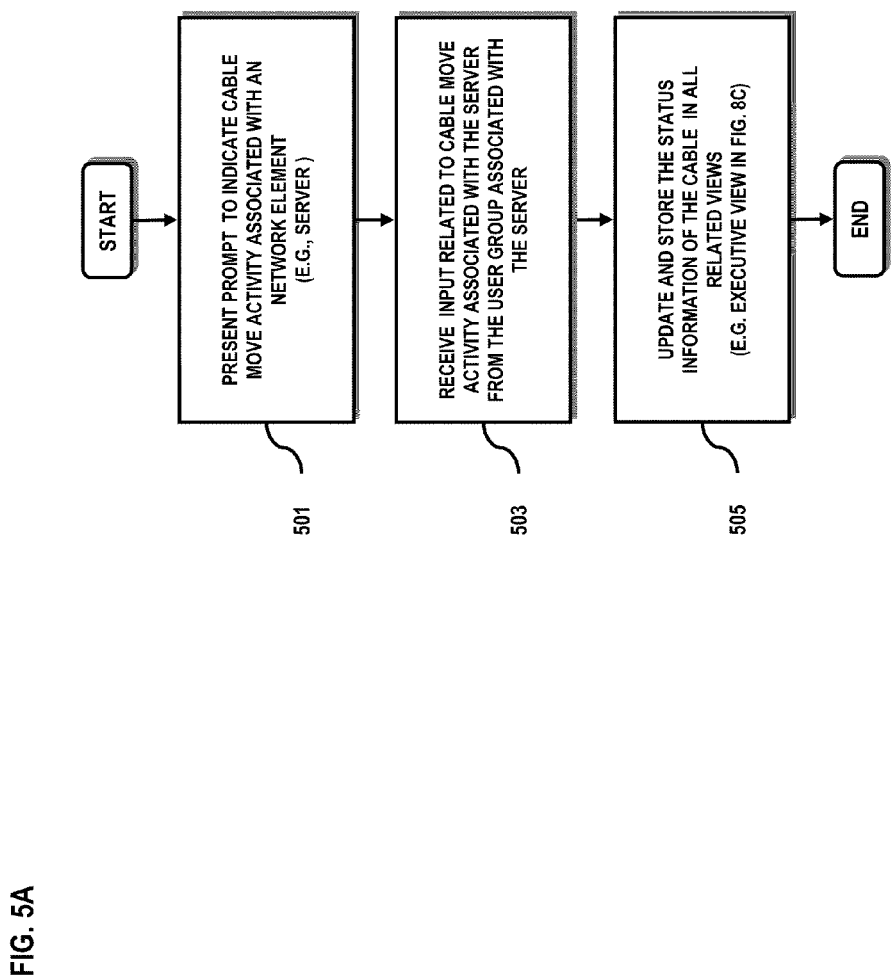
FIGS. 5A and 5B are, respectively, a flowchart of a process inputting event data, and a diagram of an exemplary GUI supporting the process, according to various embodiments.
Figure 5B:
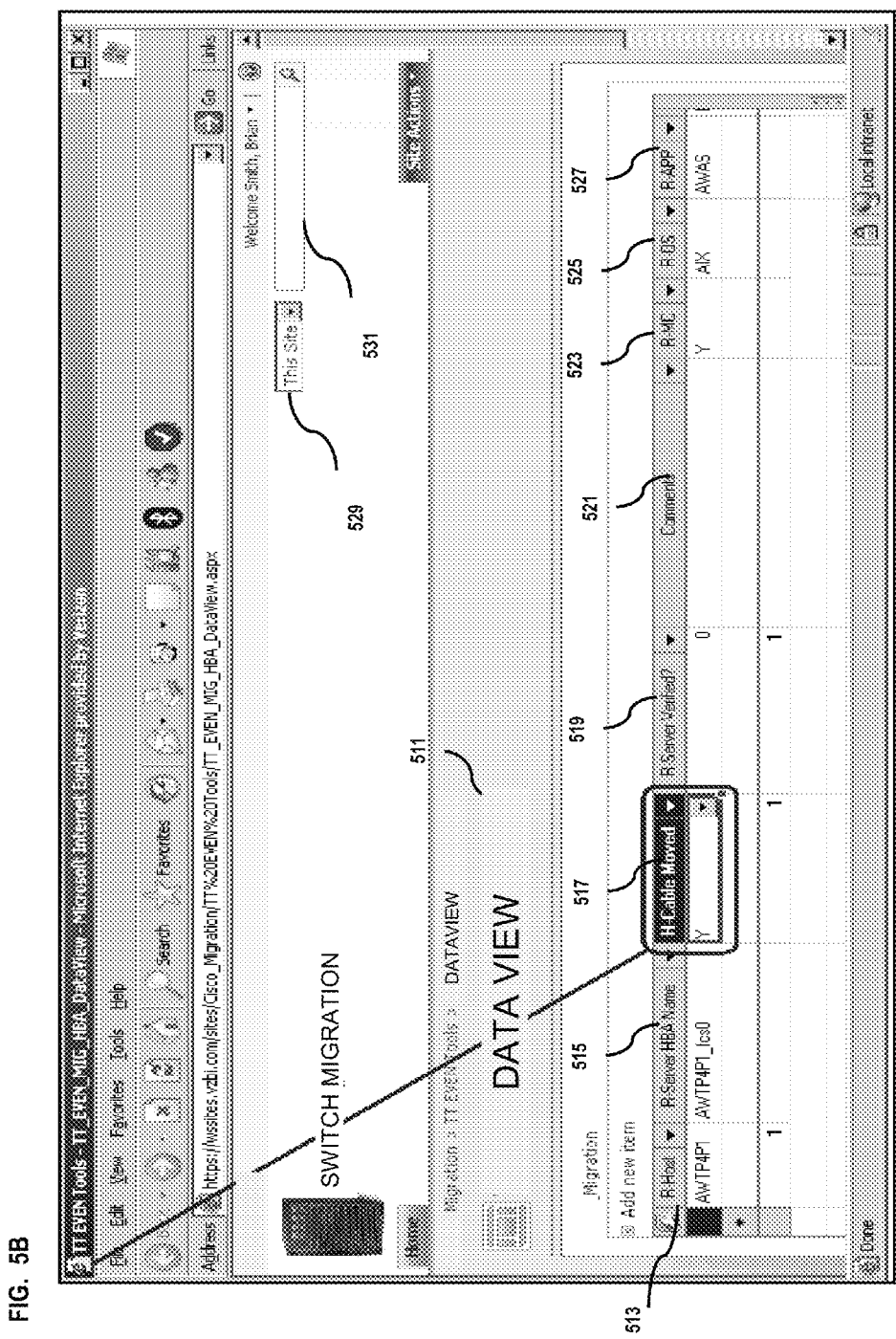

FIGS. 5A and 5B are, respectively, a flowchart of a process inputting event data, and a diagram of an exemplary GUI supporting the process, according to various embodiments. Continuing with the example of FIG. 1, different user groups, e.g., engineering teams, are tasked to replace one or more switches 105 in the SAN 101 with new switches 107 as part of a mass change to the network 101. One key aspect to these mass changes is the fact that the cutover activities must be performed largely in a sequential order by different engineering groups. For example, the user group of storage engineers might be responsible for disconnecting the predecessor switch 105 from the servers 103 and disk storage 109, and for replacing a new switch and reconnecting the cables. In the meantime, a group of server engineers might be observing the connectivity of the servers 103 to the disk storage 109 for operational issues. As explained, typically in practical SAN environments, there are a multitude of fiber cables and switches connecting the servers 103 to the disk storage 109. Each of these groups can utilize browser applications executed by the corresponding user devices 125 to access portal 121, which presents various GUIs that can support such functions as monitoring progress of the cutover by one group of users and data entry to allow other user groups to capture activities relating to the cutover events.

Platform 111 provides reporting capabilities, via presentation/reporting module 119, whereby cutover events and associated information are readily accessible by the user groups. In effect, the collective user groups may monitor in real-time the other members' activities, so that the collective workflow is efficient and timely. In this way, the users may know immediately when to act in response to completion of the tasks performed by other users; during the course of the performance of these task, the users may report their own activities via portal 121 provided by the platform 111. Because of the differing roles of the user groups, different views are generated. Consequently, each of the user groups (based on their roles) may enter data about the activity that they are engaged in using these views, as well as monitor other groups' related activities with other views.

FIG. 5A illustrates a scenario in which a user group, such as a storage engineering support team, can capture status information regarding cable movements. In this process, it is assumed that a user in the storage engineering support team properly logs on portal 121. In step 501, the user, via a browser application (e.g., web browser), is presented with a GUI (e.g., GUI 510 of FIG. 5B) that provides a prompt to enter cable move activity status of a particular server (e.g., server 103a) that the user is responsible for. View 510 is provided by the platform 111 to a group of storage engineers in this example. This view 510 is referred to as a "data view," as it permits data entry functions for the user. As seen, an area 511 specifies the name or type of view, which in this case is "DATAVIEW." In this example, a group of storage engineers are working on replacing one or more switches connected to a server named "AWTP4P1," shown in the first row of the table.

Most of the relevant data in this view 510 are included in table form with the following fields: a host name field 513, a server name field 515, a cable moved field 517, a server verified field 519, a comment field 521, a mission critical (MC) field 523, an operating system (OS) type field 525, and an application (APP) field 527. The cable moved field 517 permits the user to indicate whether the cable associated with server 103a named "AWTP4P1_fcs0" has been moved. The server verified field 519 is used to indicate whether the corresponding server's connection and/or operations has been verified; depending on the type of user (e.g., user's role), this field 519 would be read-only and not editable because the data view is provided for a different user whose responsibilities relate to the verification rather than the cable move.

The comment field 521 can be used by the storage engineer to add comments about the cable move and associated server 103a; such comments may alert other users of potential issues. The MC field 523 and associated column in view 510 can indicate whether the server 103a is mission critical to a particular site or customer, and thus, should be treated with high priority and care. The OS field 525 reveals the operating system associated with each listed server 103a; this information is helpful for testing and troubleshooting.

Returning to FIG. 5A, the user enters the status of the activity relating to cable moves. As such, the user (who belongs in the storage engineering team responsible for cable moves) can select the particular server 103a by name and then provide the status information update. With respect to view 510, the cable move field 517 is altered by the user, who can enter "Y" (or other suitable affirmative indication) as an indication that the cable move activity for that server 103a is completed. This entry thus reflects that, for instance, the SAN Fibre cable of the predecessor switch 105 has been successfully moved to the new switch 107. In one embodiment, a null entry can be viewed as non-movement or incomplete move of the subject cable. The platform 111, in step 503, receives this newly entered information; and in step 505 platform 111 stores this piece of event information and updates the related data records and views within events database 117. It is noted that other user groups can now access the updated event information in real-time; in this manner, managers may effectively monitor the entire cutover process and identify any source of delays rapidly. These users may also view pertinent information associated with this particular server 103a with fields 513, 515, 519, 521, 523, 525, and 527.

According to some embodiments, one or more of the columns (e.g., column corresponding to mission critical field 523) can serve as a text based messaging medium to send messages to the relevant parties. That is, upon the user clicking on the column or modifying the field 523, portal 121 can instruct platform 101 using communication module 120 to establish a communication session.

As shown in view 510, the user can also select a site using box 529 as a pull down menu. Additionally, a search function can be provided, whereby the user can enter the particular server name, and the view 510 can present the particular row for that server 103a as a result of the search.

Figure 6A:
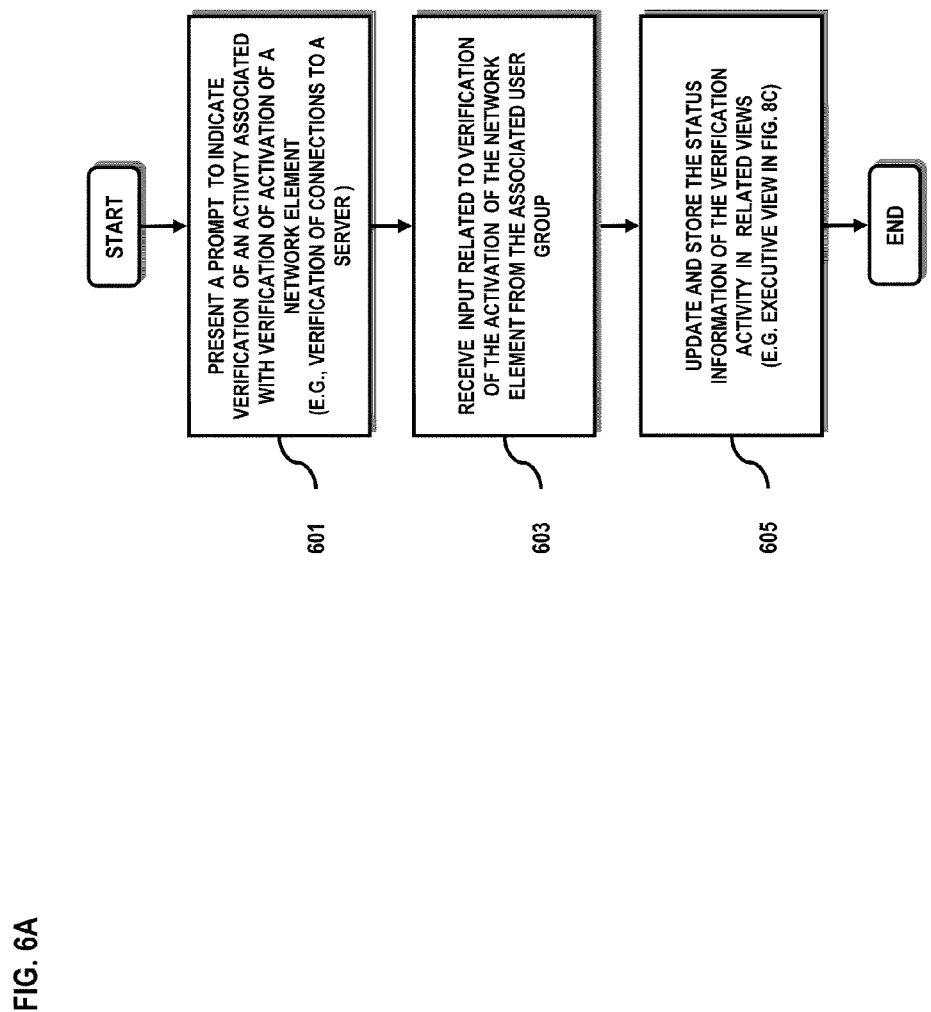
FIGS. 6A and 6B are, respectively, a flowchart of a process for inputting data pertaining to the verification of operations of a network element, and a diagram of an exemplary GUI supporting the process, according to various embodiments.
Figure 6B:
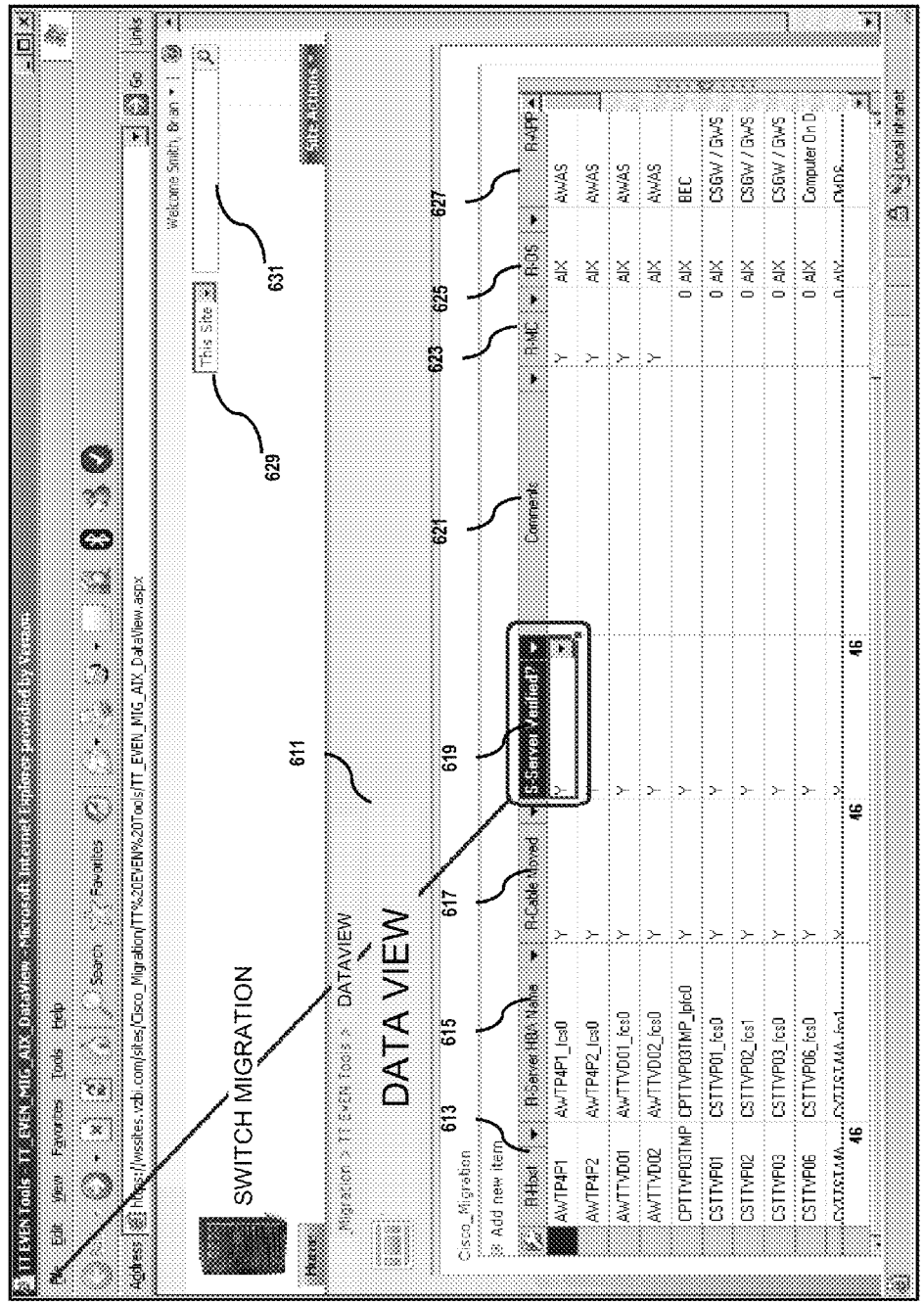

FIGS. 6A and 6B are, respectively, a flowchart of a process for inputting data pertaining to the verification of operations of a network element, and a diagram of an exemplary GUI supporting the process, according to various embodiments. Continuing with the described cutover scenario of FIGS. 5A and 5B, the functionalities of the connection verification module 119 is now described. After the predecessor switch 105 is replaced by new switch 107, a different user group, e.g., a server engineer group, is responsible for verification of the connectivity of the server 103a. This group can be presented with view 610 (shown in FIG. 6B). This data view 610 is very similar to the view 510 in FIG. 5B with different restrictions on which fields are editable by the particular user group (or particular user within the group).

As shown in FIG. 6A, in step 601, platform 101 presents a prompt, by way of portal 121, to the user (e.g., server engineer), wherein the prompt requests verification of a particular server's connection to the new network element, e.g., switch 107. According to one embodiment, the formats of GUIs 510 and 610 are similar, wherein an area 611 provides an identifier of the view (i.e., data view) as well as the following fields: a host name field 613, a server name field 615, a cable moved field 617, a server verified field 619, a comment field 621, a mission critical (MC) field 623, an operating system (OS) type field 625, and an application (APP) field 627 are provided. However, due to the different role of this engineering group, the field(s) used for inputting data and displaying the newly arrived data in the view 610 are different from those in the view 510. For example, in view 610, the cable move field 617 cannot be altered by this user (as a server engineer), as the role of a server engineer does not involve monitoring cable move activity, but conducting verification tests of the connection to the server. In this example, after the storage group completes the cable move of server AWTP4P1 and updates the cable move field 617, the server engineer can clearly see that the action is complete with the "Y" in the corresponding column. Based on that event, the server engineer can conduct the necessary tests to verify the connection of the server and upon verification, updates the server verified field 619 in the corresponding column (step 603). In step 605, platform 111 can then update this status information in events database 117, thereby effectively updating all views utilizing this information.

As seen, a search function is also provided per text boxes 629 and 631 in the manner described with respect to view 510.

It is contemplated that depending on the role of the different groups the GUIs used by the groups might have different or similar structures (e.g., number of columns, content, etc). The similarity between the structure GUI used to input the cable move activity and connection verification activity in this particular example, is particular to this example is not required part of this invention.

In addition to the described data views, portal 121 can permit users (e.g., at an administrator level) to configure the logic to reflect the events relating to the cutover or equipment migration.

Figure 7:
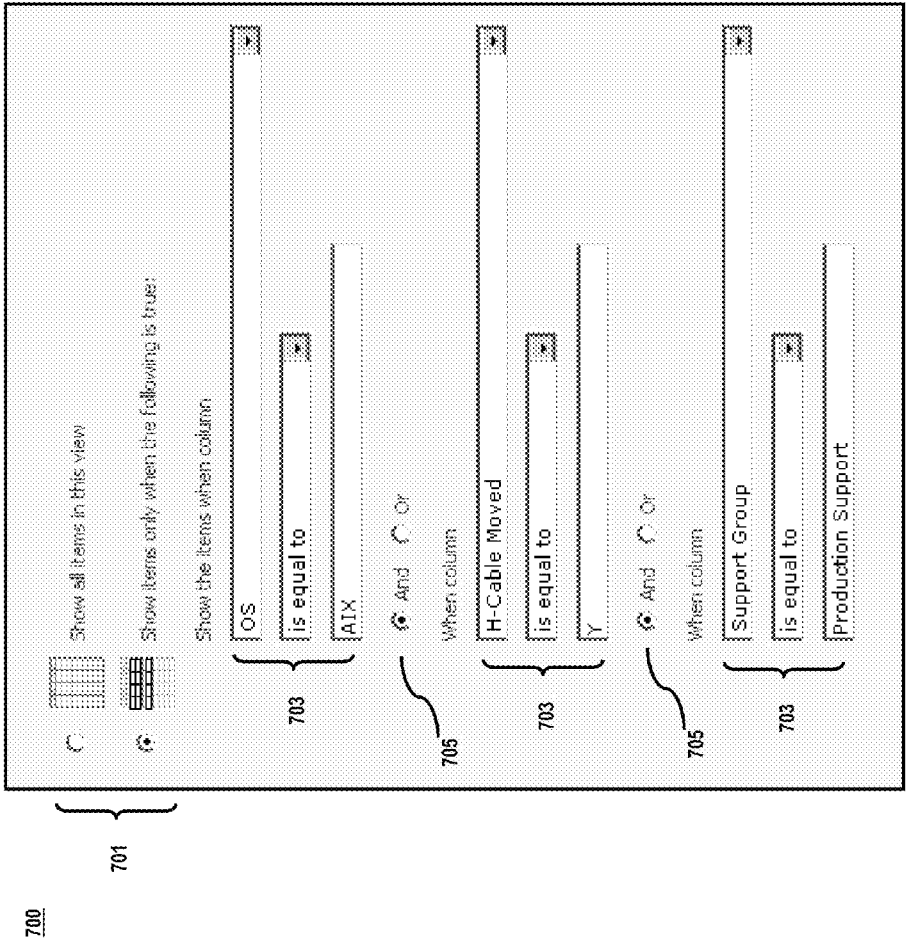
FIG. 7 is a diagram of a GUI for configuring parameters relating to cutover events, according to an exemplary embodiment.

FIG. 7 is a diagram of a GUI for configuring parameters relating to cutover events, according to an exemplary embodiment. This GUI 700 show the logic involve with sharing the event information via views 510 and 610. GUI 700 maps certain logical operations used in describing the operations to function of the platform 111. By way of example, buttons 701 permit specifying whether all information should be shared, or filtered. In this example, under the filtered information setting, filtering criteria can be specified whereby certain information are selected for inclusion in the view under certain conditions. Text boxes 703 are provided to specify these criteria. Additional, logical operations of "AND" and "OR" buttons 705 can permit advance filtering of the various parameters.

Accordingly, as an example, if a GUI view used by a group of users has a column that indicates the Operating System (OS) of the server (e.g., Advanced Interactive eXecutiv (AIX)) AND if the updated information related to cable move activity in the column H-Cable Moved is "Y" AND the user group's Support Group is Production Group, then only these information are inputted in the various views. Through GUI 700, and administrator of platform 111 can filter out or include in different user groups and network elements to receive different kinds of updates based on the nature of their roles and association, for example.

In a large cutover project, several different user groups, ranging from engineers to upper level managers (or executives), are engaged in the project from different perspectives. For instance, there is likely a management team that needs to monitor the entire migration process to ensure minimal disruption to business operations. In recognition of this, according to one embodiment, a view can be created by platform 111 that is more tailored to management goals of the cutover process, as opposed to the engineering details. This view is denoted as an "executive view," as now described.

Figure 8A:
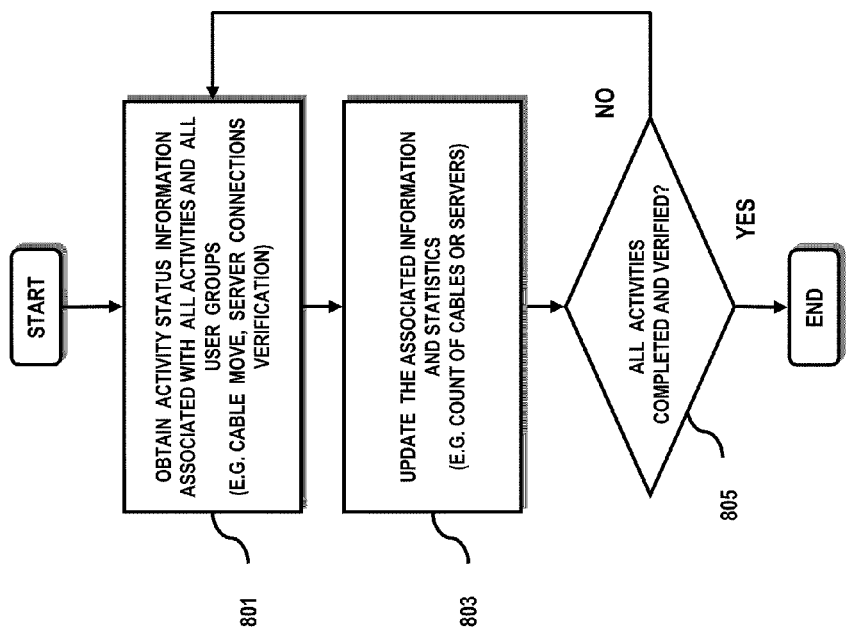
FIGS. 8A-8D are, correspondingly, a flowchart of a process for monitoring cutover events, and diagrams of exemplary GUIs supporting the process, according to various embodiments.

FIGS. 8A-8D are, correspondingly, a flowchart of a process for monitoring cutover events, and diagrams of exemplary GUIs supporting the process, according to various embodiments. By way of example, the functionality of the platform 111 is shown in FIG. 8A in relation to the executive view of GUI 810 in FIGS. 8B-8D. In step 801, upon each and every user group updating their activity status, an aggregated activity status is obtained. Thereafter, in step 803, the updated information is recorded and related statistics (e.g., count of the cable move activities) are updated in the executive GUI views. In step 805, the process determines whether all activities are completed and verified (as necessary). According to one embodiment, unless all scheduled activities are completed, platform 111 waits for further user updates.

Figure 8B:
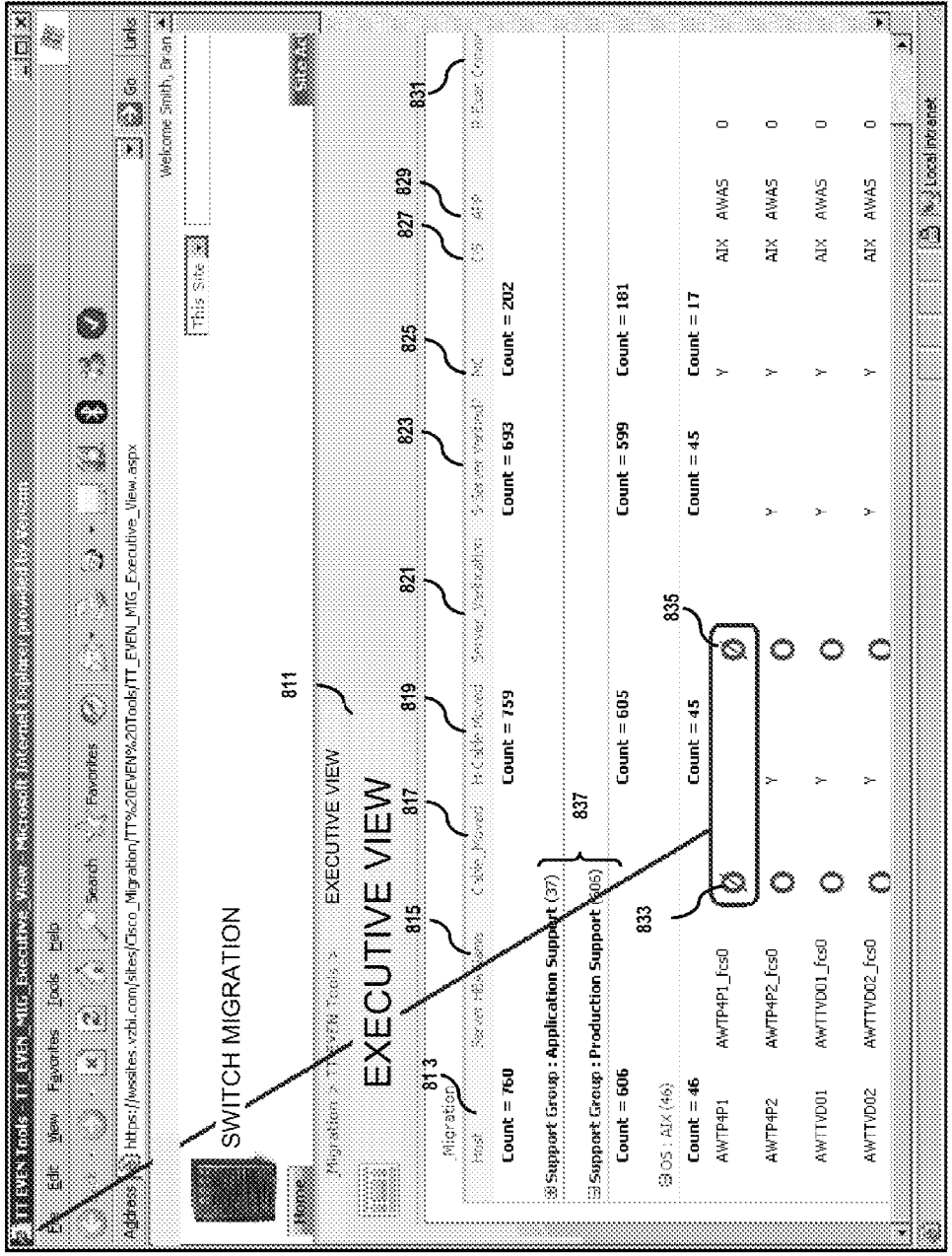
Figure 8C:
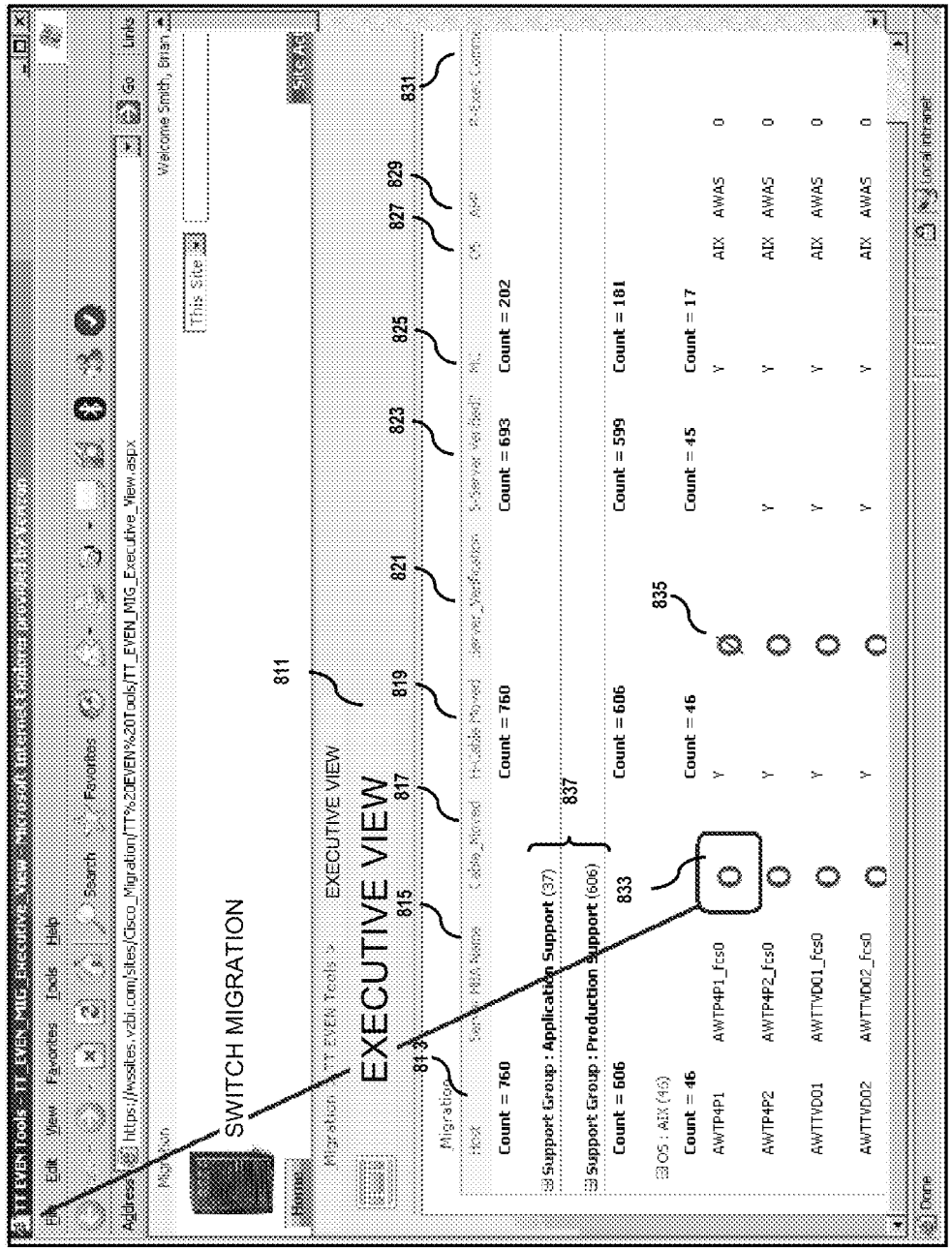
Figure 8D:
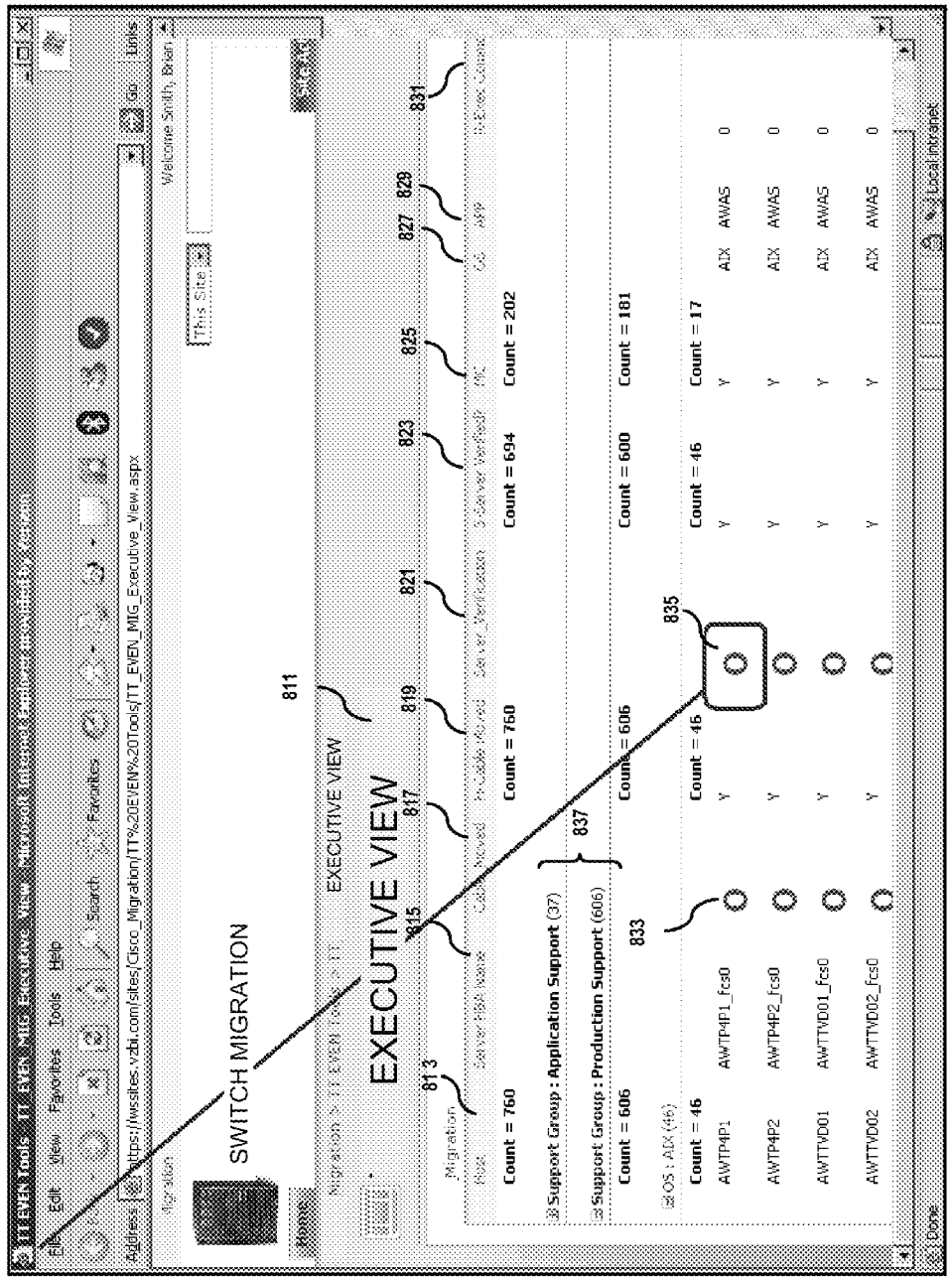

The GUI 810, shown in FIGS. 8B-8D, is explained in conjunction with the previous data views 510 and 610. In this GUI 810, the users (e.g., project managers) can monitor the status of different activities related to different network elements and observe the relevant statistics. This view 810 aggregates the information contents of all the views available to different user groups associated with different network elements. As a result, the executive view 810 also allows the managers to monitor the operations performed by different categories of groups. In this example, the format of GUI 810 resembles that of views 510 and 610 in that section 811 for the name of the view and fields 813-827 are identical, but some additional features are provided. For example, this executive view 810 can provide total count information for fields 813, 819, 823, and 825. In this way, the total number of hosts, cables moved, and verified servers can be tabulated. Furthermore, an executive comments field 831 permits managers to post comments for the various groups. According to certain embodiments, areas 833 and 835 provide a graphical means to show the same information as in their adjacent columns corresponding to fields 817 and 821. Thus, users of this executive view 810 can easily obtain the information visually. For example, when the cable move activity for a server is completed, a large "O" indicating such completion will replace a "Ø" in the column 817 (a "Y" appears in column 817); this is shown in FIG. 8C. In some embodiments, the symbols O and Ø can be color coded (e.g., red and green, respectively) to allow the users to more vividly perceive the information.

Furthermore, executive view 810 presents a collapsible view 837 of different user groups (or support groups). In this example, the application support group is shown in collapsed form, in which a total "(37)" is provided for this group's count. Also, a production support group has an associated total of "(606)" in an expanded form; as shown, various classifications for the servers can be provided, such as servers having a particular operating system (e.g., AIX). These counts relate to the groups' particular functions or tasks that have been executed.

GUI 810 can be described in relation to the views 510 and 610, whereby different users are monitoring the same event. For example, in GUI 810, a row specifies the server AWTP4P1, which contains the same fields as a row corresponding to this server in the other views. As a result, the same information related to the status of actions associated with the server AWTP4P1 is presented in views 510 and 610. Hence, as soon as the storage and server engineers update the associated status of this server in their respective views 510 and 610, the updated information will be reflected in the GUI view 810. In FIG. 8B, no action related to the server AWTP4P1 is taken as yet, as evident by the two Ø's. In FIG. 8C, upon completion of the cable move activity, the storage engineer updates the related field in his/her own view (as in FIG. 5B); and as a result, managers in their executive view can see a circle "O" in the field 833 (which corresponds to the cable moved field 819); the appropriate counts are also updated.

It is noted in FIG. 8C that the fields associated with verification of the mentioned server still show no progress with regards to the verification of the server. Next, in FIG. 8D, upon the verification of the server by the server engineer, the section 835 shows a circle "O" and the count of the overall verified servers is updated.

The above processes and arrangement, in certain embodiments, advantageously permit a highly coordinated, efficient management of cutover activities, whereby delays are minimized. Also, inefficient communication methods (i.e., "chatter") are avoided, through the use of a real-time views that capture and update relevant data. These views are customized or tailored to the users based on their roles or user group designations.

The processes described herein for managing cutover events may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
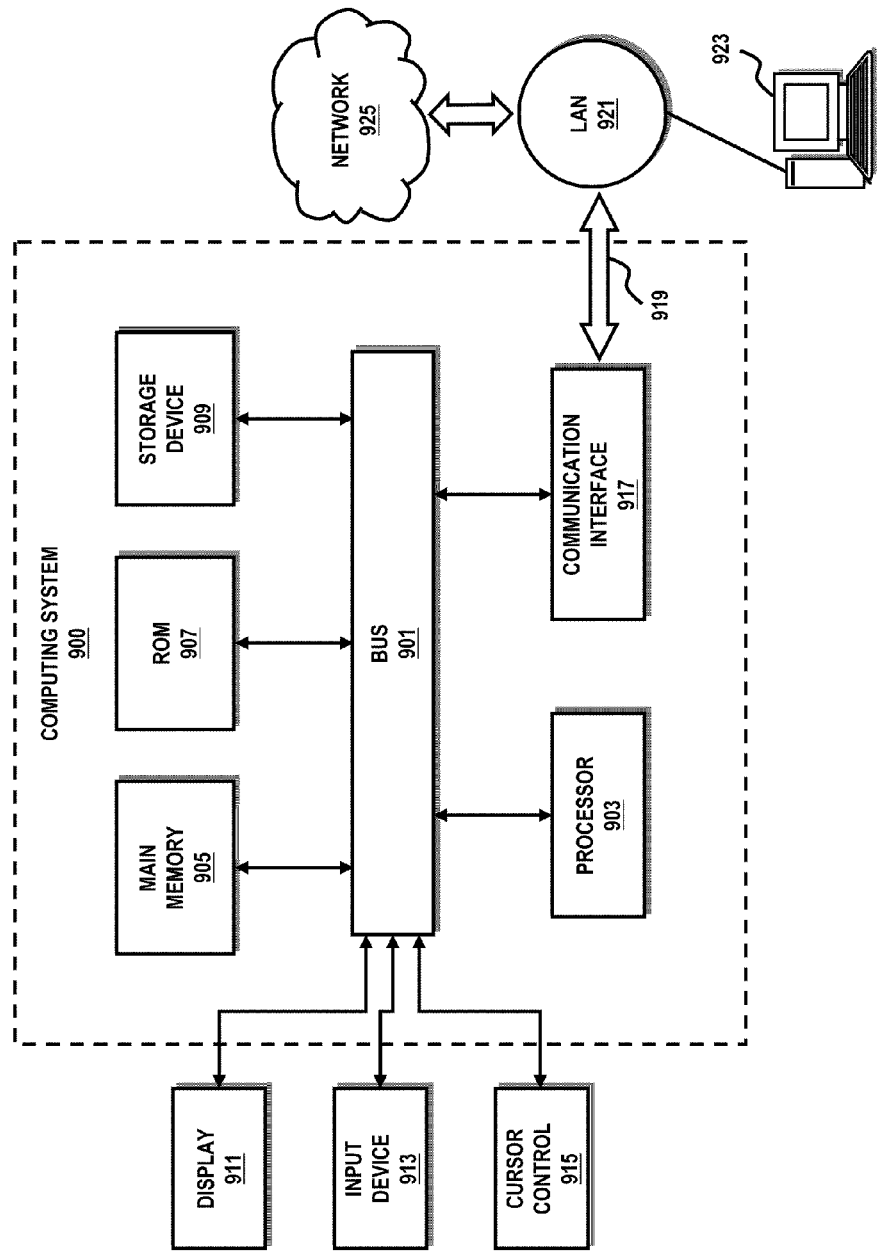
FIG. 9 is a diagram of a computer system that can be used to implement various exemplary embodiments.

FIG. 9 illustrates computing hardware (e.g., computer system) 900 upon which exemplary embodiments can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
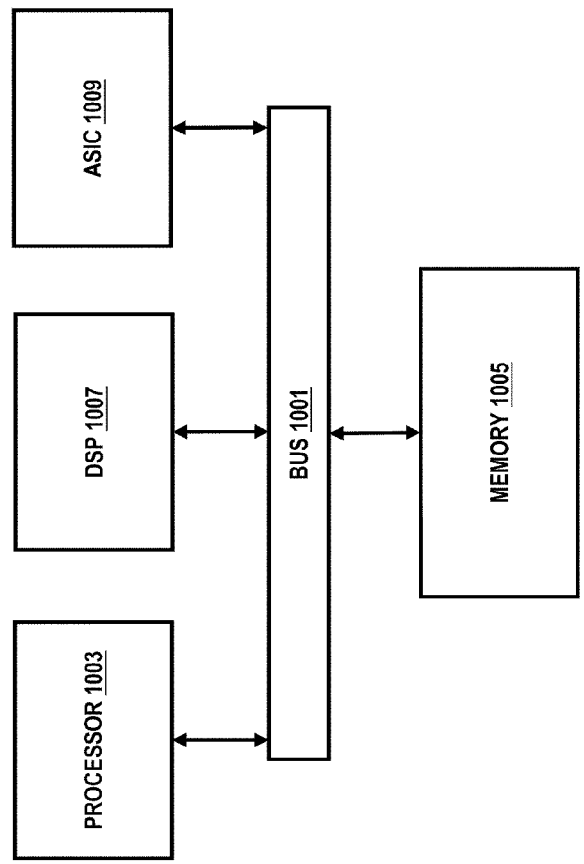
FIG. 10 is a diagram of a chip set that can be used to implement various exemplary embodiments.

FIG. 10 illustrates a chip set 1000 upon which an embodiment of the invention may be implemented. Chip set 1000 is programmed to present views and manage cutover events as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 3, 4A, 4B, 5A, 6A, and 8A.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   tracking a plurality of events relating to activation of one or more network elements that replace one or more predecessor network elements, wherein the events include movement of cables for the one or more network elements and activities corresponding to verification of connections over the cables;
   storing event information relating to the events, the event information including status information regarding whether or not there has been movement of cables for the one or more network elements that replace the one or more predecessor network elements, and status information regarding whether or not there has been verification of the connections over the cables for the one or more network elements that replace the one or more predecessor network elements;
   providing access to the stored event information for presentation via a portal;
   receiving update of the status information;
   storing the updated status information as part of the stored event information;
   associating the network elements with one or more user groups; and
   generating a plurality of views corresponding to the stored event information,
   wherein the views are accessible via the portal by a user associated with one of the user groups,
   wherein the view of at least one user group includes the ability to input certain data associated with the at least one user group,
   wherein a text based communication session is established upon the user associated with the at least one user group clicking on a particular column or field,
   wherein the text based communication session is used to send messages to relevant parties associated with the plurality of events relating to activation of one or more network elements that replace one or more predecessor network elements,
   wherein in the update of the status information includes an indication that one or more cables for the one or more network elements that replace the one or more predecessor network elements have been moved after a prior status information included an indication that one or more cables for the one or more network elements that replace the one or more predecessor network elements have not been moved, and
   wherein a network in which the one or more network elements are to replace the one or more predecessor network elements is maintained operational throughout replacing the one or more predecessor network elements.

2. A method according to claim 1, wherein the events include activities corresponding to deactivation of the one or more predecessor network elements and disconnection of the cables with the one or more predecessor network elements.

3. A method according to claim 1, wherein the tracking of the events is performed in real-time.

4. A method according to claim 1,
   wherein the one or more network elements include a switch in support of connection of servers to storage in a storage area network (SAN), and
   connection of the servers to the storage of the SAN during replacement of the switch is maintained via a redundant switch.

5. A method according to claim 1
   wherein the inputted certain data is viewable in the views of one or more user groups that is different from the user group that inputted the certain data.

6. A method according to claim 1, wherein the user groups include users having different roles, and the views specify report content that is dependent on the roles of the users.

7. An apparatus comprising:
   at least one processor; and
   at least one memory including computer program code, the at least one memory and the computer program code being configured, with the at least one processor, to cause the apparatus at least to:
   track a plurality of events relating to activation of one or more network elements that replace one or more predecessor network elements, wherein the events include movement of cables for the one or more network elements and activities corresponding to verification of connections over the cables,
store event information relating to the events, the event information including status information regarding whether or not there has been movement of cables for the one or more network elements that replace the one or more predecessor network elements, and status information regarding whether or not there has been verification of the connections over the cables for the one or more network elements that replace the one or more predecessor network elements,
provide access to the stored event information for presentation via a portal,
receive update of the status information;
store the updated status information as part of the stored event information;
associate the network elements with one or more user groups; and
generate a plurality of views corresponding to the stored event information,
wherein the views are accessible via the portal by a user associated with one of the user groups,
wherein the view of at least one user group includes the ability to input certain data associated with the at least one user group and the inputted certain data cannot be altered by any other user group,
wherein a text based communication session is established upon the user associated with the at least one user group clicking on a particular column or field,
wherein the text based communication session is used to send messages to relevant parties associated with the plurality of events relating to activation of one or more network elements that replace one or more predecessor network elements,
wherein in the update of the status information includes an indication that one or more cables for the one or more network elements that replace the one or more predecessor network elements have been moved after a prior status information included an indication that one or more cables for the one or more network elements that replace the one or more predecessor network elements have not been moved, and
wherein a network in which the one or more network elements are to replace the one or more predecessor network elements is maintained operational throughout replacing the one or more predecessor network elements.

8. An apparatus according to claim 7, wherein the events include activities corresponding to deactivation of the one or more predecessor network elements and disconnection of the cables with the one or more predecessor network elements.

9. An apparatus according to claim 7, wherein the tracking of the events is performed in real-time.

10. An apparatus according to claim 7,
wherein the one or more network elements include a switch in support of connection of servers to storage in a storage area network (SAN), and
connection of the servers to the storage of the SAN during replacement of the switch is maintained via a redundant switch.

11. An apparatus according to claim 7,
wherein the inputted certain data is viewable in the views of one or more user groups that is different from the user group that inputted the certain data.

12. An apparatus according to claim 7, wherein the user groups include users having different roles, and the views specify report content that is dependent on the roles of the users.

13. A non-transitory computer-readable storage medium carrying one or more sequences of one or more instructions which, when executed by one or more processors, cause a system to at least perform the following steps:
track a plurality of events relating to activation of one or more network elements that replace one or more predecessor network elements, wherein the events include movement of cables for the one or more network elements and activities corresponding to verification of the connections over the cables;
store event information relating to the events, the event information including status information regarding whether or not there has been movement of cables for the one or more network elements that replace the one or more predecessor network elements, and status information regarding whether or not there has been verification of the connections over the cables for the one or more network elements that replace the one or more predecessor network elements;
provide access to the stored event information;
receive update of the status information;
store the updated status information as part of the stored event information;
associate the network elements with one or more user groups; and
generate a plurality of views corresponding to the stored event information,
wherein the views are accessible via the portal by a user associated with one of the user groups,
wherein the view of at least one user group includes the ability to input certain data associated with the at least one user group and the inputted certain data cannot be altered by any other user group,
wherein a text based communication session is established upon the user associated with the at least one user group clicking on a particular column or field,
wherein the text based communication session is used to send messages to relevant parties associated with the plurality of events relating to activation of one or more network elements that replace one or more predecessor network elements,
wherein in the update of the status information includes an indication that one or more cables have been moved after a prior status information included an indication that one or more cables for the one or more network elements that replace the one or more predecessor network elements have not been moved, and
wherein a network in which the one or more network elements are to replace the one or more predecessor network elements is maintained operational throughout replacing the one or more predecessor network elements.

14. A non-transitory computer-readable storage medium according to claim 13, wherein the events include activities corresponding to deactivation of the one or more predecessor network elements and disconnection of the cables with the one or more predecessor network elements.

15. A non-transitory computer-readable storage medium according to claim 13, wherein the tracking of the events is performed in real-time.

16. A non-transitory computer-readable storage medium according to claim 13, wherein the one or more network elements include a switch in support of connection of servers to storage in a storage area network (SAN), and connection of the servers to the storage of the SAN during replacement of the switch is maintained via a redundant switch.

17. A non-transitory computer-readable storage medium according to claim 13, wherein the inputted certain data is viewable in the views of one or more user groups that is different from the user group that inputted the certain data.

18. A non-transitory computer-readable storage medium according to claim 13, wherein the user groups include users having different roles, and the views specify report content that is dependent on the roles of the users.

* * * * *